US005996341A

United States Patent [19]

Tohji

[11] Patent Number: 5,996,341

[45] **Date of Patent: *Dec. 7, 1999**

[54] HYDRAULIC CONTROL CIRCUIT IN A HYDRAULIC EXCAVATOR

[75] Inventor: Yutaka Tohji, Hiroshima, Japan

[73] Assignee: Kabushiki Kaisha Kobe Keiko Sho, Tokyo, Japan

[ * ] Notice: This patent is subject to a terminal disclaimer.

[21] Appl. No.: 08/941,035

[22] Filed: Sep. 30, 1997

[30] Foreign Application Priority Data

Sep. 30, 1996 [JP] Japan .................................... 8-280280

[51] Int. Cl.[6] .................................................... F16D 31/02

[52] U.S. Cl. ................................ 60/421; 60/429; 91/444; 91/513

[58] Field of Search ........................ 91/444, 513; 60/421, 60/428

[56] References Cited

U.S. PATENT DOCUMENTS

| | | | |
|---|---|---|---|
| 4,030,623 | 6/1977 | Bridwell et al. | 60/421 |
| 5,083,428 | 1/1992 | Kubomoto et al. | 60/421 |
| 5,277,027 | 1/1994 | Aoyagi et al. | 60/420 |

FOREIGN PATENT DOCUMENTS

| | | |
|---|---|---|
| 5-44234 | 2/1993 | Japan . |
| 6-240709 | 8/1994 | Japan . |
| 7-189296 | 7/1995 | Japan . |

*Primary Examiner*—F. Daniel Lopez
*Attorney, Agent, or Firm*—Oblon, Spivak McClelland, Maier & Neustadt, P.C.

[57] ABSTRACT

A cut-off valve is mounted so that it can open and close an oil passage which leads a pressure oil discharged from a first pump into a hydraulic oil tank in a neutral state of a spool valve for boom. When an operating lever for boom and an operating lever for arm have simultaneously been operated to a boom raising side and an arm pulling side, respectively, the cut-off valve is closed in proportion to a boom raising or arm pulling pilot pressure. The cut-off valve is controlled using as a parameter a differential pressure between the arm pulling pilot pressure and the boom raising pilot pressure. By doing so, there is obtained a low gain operability in the crane work, while in the parallel pulling work there is obtained an operability of a relatively high gain which matches a quick motion of the arm.

8 Claims, 7 Drawing Sheets

HYDRAULIC CONTROL CIRCUIT IN A HYDRAULIC EXCAVATOR

BACKGROUND OF THE INVENTION

1. Field of the Invention

The present invention relates to a hydraulic control circuit in a hydraulic excavator.

2. Description of the Related Art

A hydraulic excavator is used for various works and is required to have an operability suitable for each work. In a crane operation, an operability with a high gain control is required to operate precisely. On the other hand, in a parallel pulling operation (both boom raising and arm pulling operations are performed simultaneously, the motion of arm is relatively fast because the arm falls with its own weight and there is adopted a regeneration circuit), an operability with a high gain control is required to operate the arm fastly.

FIG. 8 is a hydraulic circuit diagram showing the prior art described in Japanese Patent Laid Open No. 189296/95. At the beginning of the parallel pulling operation in the hydraulic excavator disclosed therein, if an operating lever of a flow control valve 6 for boom is moved quickly, a pressure compensating valve 9 is throttled transitionally so as to greatly decrease the flow rate of pressure oil fed to an arm cylinder 4. As a result, even if the amount of of discharged from a pump is in a state of saturation and a boom cylinder 3 is an actuator for a high load pressure, a response delay of the pressure compensating valve 9 is remedied at the beginning of the parallel pulling work, whereby the fall of arm can be prevented.

FIG. 9 is a hydraulic circuit diagram showing the prior art described in Japanese Patent Laid Open No. 44234193. At the time of parallel pulling operation in the hydraulic excavator disclosed therein, if an arm dosing operation (arm pulling operation) is performed, a directional control valve 7 changes its flow passage, so that an oil pressure source 8' and a signal passage “c” are connected with each other, so that pressure oil passes through the signal passage “c” and causes a pilot check valve 6' to operate to its opening side. Consequently, the downstream side of an arm spool 3' bypasses a boom two-speed spool 2' and communicates with a tank T by means of the pilot check valve 6', so that the opening of the arm spool 3' is not interfered by the boom two-speed spool 2'. That is, in the arm dosing operation, a boom two-speed confluence is cut off to improve the parallel pulling performance.

The bleed-off of a main spool of a directional control valve for boom in a hydraulic excavator possesses a characteristic having a precise operability (i.e. low gain) and so is unsuitable for works for which high responsivity (i.e. high gain) is required. Therefore, various means have been proposed for improving the boom raising operability in works requiring a high responsivity (for example, the parallel pulling work).

In the hydraulic control system shown as an example of the prior art in FIG. 8, when the oil from a single hydraulic pump 2 is distributed to the flow control valve 6 for boom and a flow control valve 8 for arm, the distribution ratio can be changed. More particularly, in the parallel pulling operation, as the amount of operation of the flow control valve 6 for boom increases, the amount of rise of the boom increases in proportion thereto. Consequently, there arises a great difference between the amount of operation of the operating lever for boom and that of the operating lever for arm, and thus the boom raising operation is not easy.

In the prior art shown in FIG. 9, the boom two-speed confluence is cut off at the time of arm closing operation to prevent rising of the boom. Therefore, when the amount of operation of the arm operating lever is larger than the amount of operation of the boom operating lever, it is difficult to increase the boom raising speed.

SUMMARY OF THE INVENTION

It is an object of the present invention to provide a hydraulic control circuit in a hydraulic excavator capable of obtaining an operability with a low gain in the crane work and an operability with a relatively high gain in the parallel pulling work.

It is another object of the present invention to provide a hydraulic control circuit in a hydraulic excavator capable of obtaining a high inching performance of the boom in the crane work and obtaining a good operability in the parallel pulling work.

Preferably, the hydraulic control circuit in a hydraulic excavator according to the present invention is provided with a first hydraulic pump for feeding a pressure oil to a boom cylinder in accordance with the operation of an operating lever for boom, a second hydraulic pump for feeding a pressure oil to an arm cylinder in accordance with the operation of an operating lever for arm, and a cut-off valve capable of opening and closing an oil passage which leads the pressure oil discharged from the first hydraulic pump into a hydraulic oil tank. According to this control circuit, when the operating lever for raising the boom and the operating lever for pulling the arm are operated simultaneously, the cut-off valve is closed to increase the boom raising gain.

Preferably, in increasing the gain, the cut-off valve is closed in proportion to a boom raising pilot pressure which is derived from a hydraulic remote control valve for boom by operation of the operating lever for boom.

Thus, in the above preferred embodiment of the present invention, the step-up sensitivity in pump pressure of the first hydraulic pump is improved, with the result that the boom raising gain increases and it is possible to match with the arm pulling operation.

In increasing the gain, it is also preferable that the cut-off valve is closed in proportion to an arm pulling pilot pressure which is derived from a hydraulic remote control valve for arm by operation of the operating lever for arm. In this case, it is more preferred to lower the proportional gain and thereby suppress the maximum gain.

In this preferred embodiment of the invention, it is possible to prevent the occurrence of a side effect such as, for example, an excessive closing of a bypass passage with the cut-off valve and the resulting jump-up of the boom.

In increasing the gain, moreover, it is preferable that the boom raising pressure is increased in the case where the amount of operation of the operating lever for arm is larger than the amount of operation of the operating lever for boom. It is more preferable to close the cut-off valve in proportion to a differential pressure between the arm pulling pilot pressure and the boom raising pilot pressure.

In this preferred embodiment of the invention, therefore, in the case where the parallel pulling operation can be controlled by operating both boom and arm levers in the same depth (the same amount of operation) and in the case where the arm operating lever precedes the boom operating lever, it is possible to quicken the boom raising operation automatically.

More preferably, when the boom operating lever is operated to the boom raising side and the arm operating lever is simultaneously operated to the arm pulling side, the flow rate of oil discharged from the first hydraulic pump is also increased accordingly. Thus, in addition to the increase of the boom raising pressure made by throttling the bypass passage, the flow rate of oil discharged from the pump is also increased, so that a more outstanding effect can be exhibited

DESCRIPTION OF THE PREFERRED EMBODIMENT

An embodiment of the present invention will be described in detail hereinunder with reference to the accompanying drawings.

Figure 1:
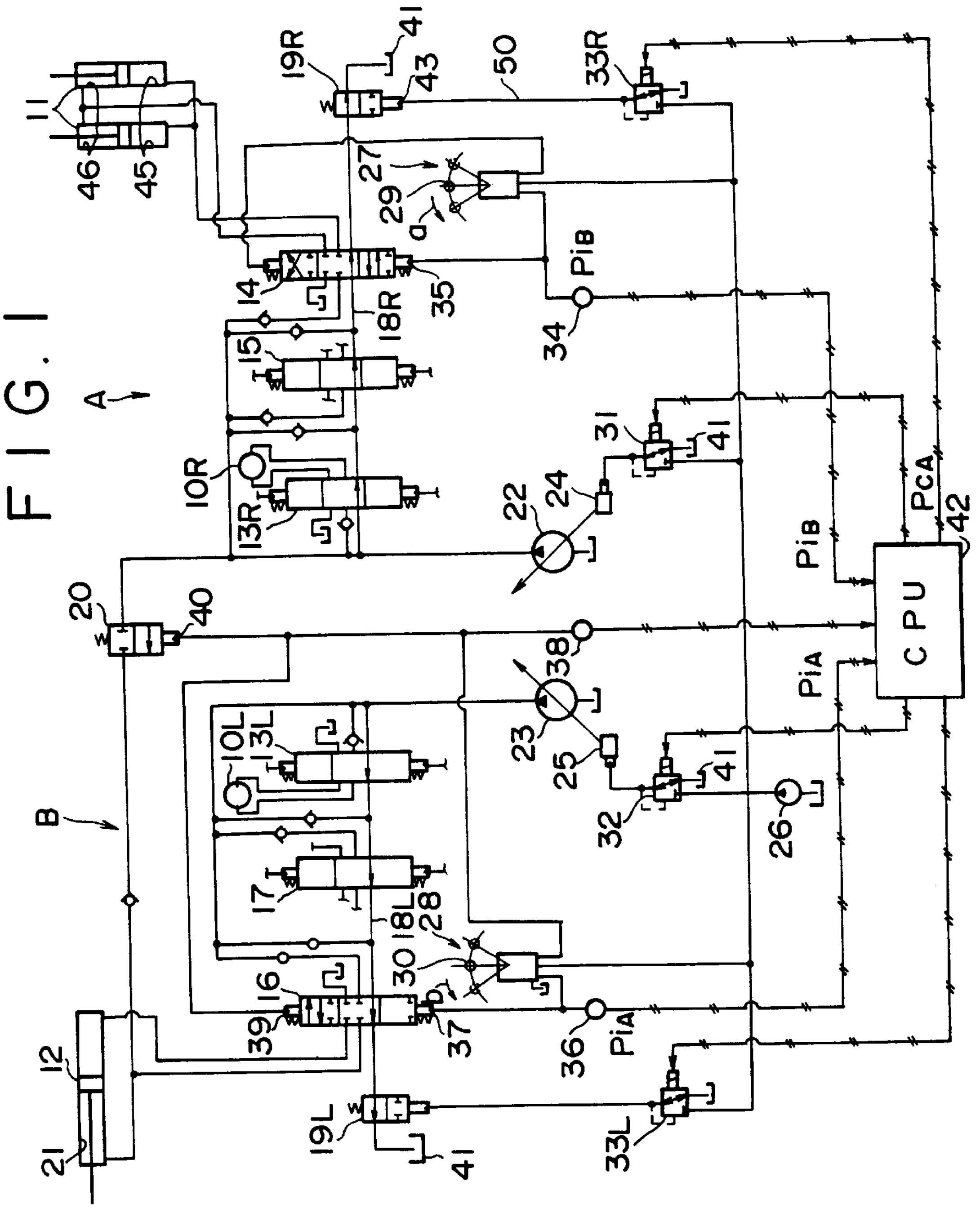
FIG. 1 is a circuit diagram showing a hydraulic control circuit embodying the present invention.

FIG. 1 is a circuit diagram showing a hydraulic control circuit in a hydraulic excavator according to the present invention. In the same figure, the reference numerals 10L and 10R denote a pair of right and left traveling motors mounted on a lower carriage (not shown) of the hydraulic excavator. Numeral 11 denotes a boom cylinder for driving a boom (not shown) attached to the front portion of an upper rotating structure of the hydraulic excavator. Numeral 12 denotes an arm cylinder connected rotatably to the front end portion of the boom. Numerals 13L and 13R denote left and right directional control valves for traveling which control the left and right traveling motors 10L and 10R, respectively. Numeral 14 denotes a spool valve for boom which is a directional control valve for controlling the boom cylinder 11. Numeral 15 denotes a directional control valve for controlling another hydraulic actuator (not shown). Numeral 16 denotes a spool valve for arm which is a directional control valve for controlling the arm cylinder 12. Numeral 17 denotes a directional control valve for controlling another hydraulic actuator (not shown). Numeral 18R denotes a bypass passage extending through directional control valves in group A consisting of directional control valves 13R, 15 and 14. Numeral 18L denotes a bypass passage extending through directional control valves in group B consisting of directional control valves 13L, 17 and 16. Numerals 19L and 19R denote cut-off valves disposed in downstream-side outlets of the bypass passages 18L and 18R so that they can open and close the bypass passages. Numeral 20 denotes a confluent valve for supplying a confluent pressure oil to a rod-side oil chamber 21 which is an arm pushing-side oil chamber in the arm cylinder 12. Numeral 22 denotes a first hydraulic pump for supplying a main pressure oil to group A. Numeral 23 denotes a second hydraulic pump for supplying a main pressure oil to group B. Numerals 24 and 25 denote regulators for the first and second pumps 22, 23, respectively. Numeral 26 denotes a pilot pump as a pilot oil pressure source. Numerals 27 and 28 denote hydraulic remote control valves for boom and arm, respectively. Numerals 29 and 30 denote operating levers for boom and arm, respectively, which levers are for operating the hydraulic remote control valve 27 for boom and the hydraulic remote control valve 28 for arm, respectively. Numerals 31, 32, 33L and 33R denote electromagnetic proportional pressure reducing valves. The electromagnetic proportional valves 31, 32, 33L and 33R control the regulator 24, regulator 25, cut-off valve 33L and cut-off valve 33R, respectively. Numeral 34 denotes a pressure sensor as a boom raising operation detecting means which detects a pilot pressure acting on a boom raising-side pilot port 35 of the spool valve 14 for boom. Numeral 36 denotes a pressure sensor as an arm pulling operation detecting means which detects a pilot pressure on an arm pulling-side pilot port 37 of the spool valve 16 for arm. Numeral 38 denotes a pressure sensor as an arm pulling operation detecting means which detects a pilot pressure on both an arm pushing-side pilot port 39 of the spool valve 16 for arm and a pilot port 40 of the confluent valve 20. Numeral 41 denotes a hydraulic oil tank and numeral 42 denotes a controller.

As shown in FIG. 1, the hydraulic excavator equipped with the hydraulic control circuit of the invention is provided with the first hydraulic pump 22 for feeding a pressure oil to the boom cylinder 11 through the spool valve 14 for boom which operates in accordance with the operation of the operating lever 29 for boom, the second hydraulic pump 23 for feeding a pressure oil to the arm cylinder 12 through the spool valve 16 for arm which operates in accordance with the operation of the operating lever 30 for arm, and the confluent valve 20 which joins the oil discharged from the first pump 22 and the oil discharged from the second pump 23 in accordance with an arm pushing operation of the operating lever 30 for arm at the time of arm pushing operation of the arm cylinder 12 and which supplies the thus-joined oil stream to the rod-side oil chamber 21 of the arm cylinder 12. Further, three signals provided respectively from the pressure sensor 34 as a boom raising operation detecting means, the pressure sensor 36 as an arm pulling operation detecting means and the pressure sensor 38 as an arm pushing operation detecting means.

Figure 2:
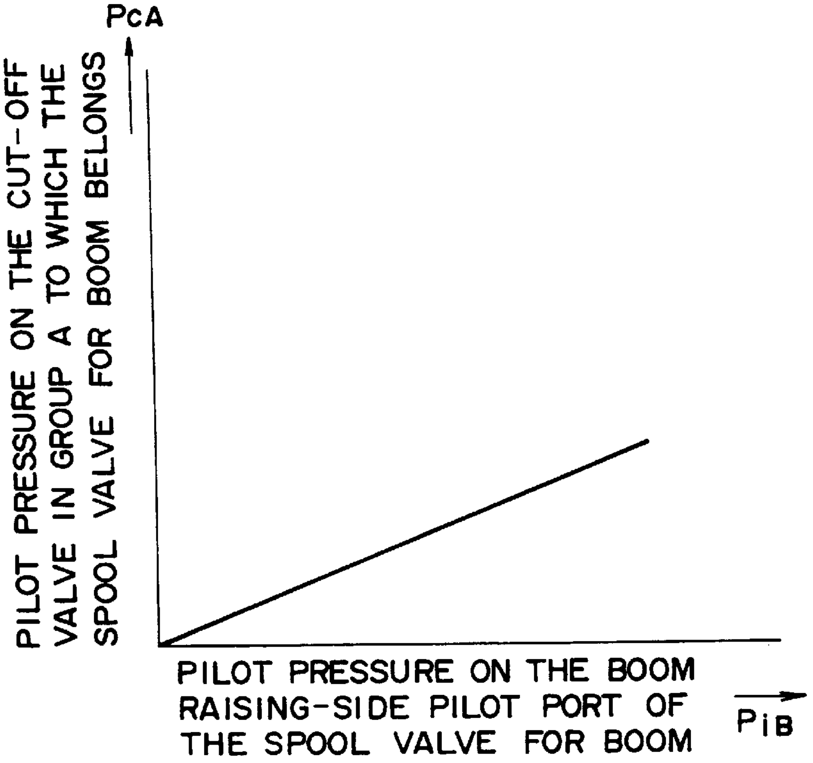
FIG. 2 is a graph showing a relation between a pilot pressure PiB on a boom raising-side pilot port of a spool valve for boom and a pilot pressure PCA on a pilot port of a cut-off valve in group A.

Next, FIG. 2 is a graph showing a relation between a pilot pressure PiB on the boom raising-side pilot port 35 of the spool valve 14 for boom and a pilot pressure PCA on a pilot port 43 of the cut-off valve 19R in group A. As shown in the same figure, both pilot pressures are in proportion to each other.

Figure 3:
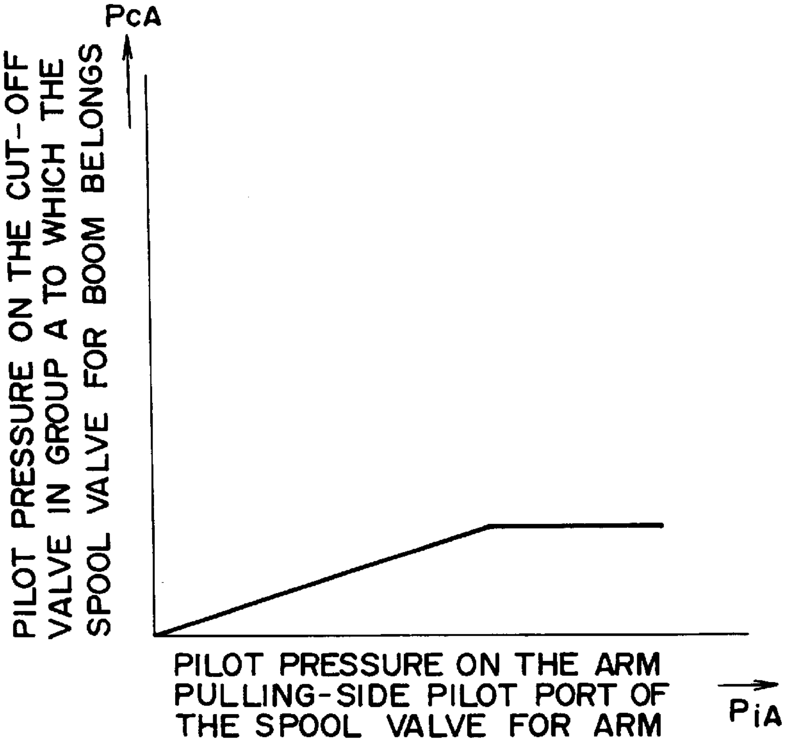
FIG. 3 is a graph showing a relation between a pilot pressure PiA on an arm pulling-side pilot port of a spool valve for arm and the pilot pressure PCA on the pilot port of the cut-off valve in group A.

FIG. 3 is a graph showing a relation between a pilot pressure PiA on the arm pulling-side pilot port 37 of the spool valve 16 for arm and the pilot pressure PCA on the pilot port 43 of the cut-off valve 19R in group A As shown in FIG. 3, the pilot pressure PCA is proportional to the pilot pressure PiA until the pilot pressure PiA reaches a certain value, and thereafter the pilot pressure PCA is constant irrespective of the pilot pressure PiA.

Figure 4:
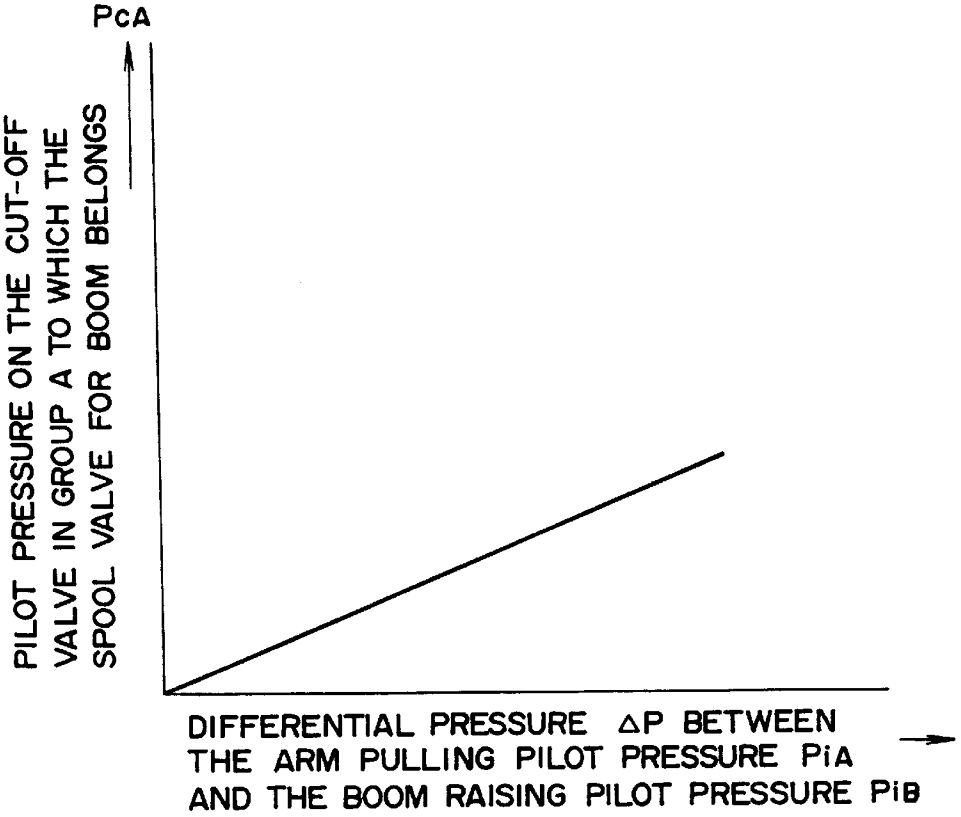
FIG. 4 is a graph showing a relation of a differential pressure ΔP between the arm pulling pilot pressure PiA and the boom raising pilot pressure PiB to the pilot pressure PCA on the pilot port of the cut-off valve in group A.

FIG. 4 is a graph showing a relation of a differential pressure ΔP between the arm pulling pilot pressure PiA and the boom raising pilot pressure PiB to the pilot pressure PCA on the pilot port 43 of the cut-off valve 19R in group A. Both are proportional to each other, as shown in FIG. 4.

Figure 5:
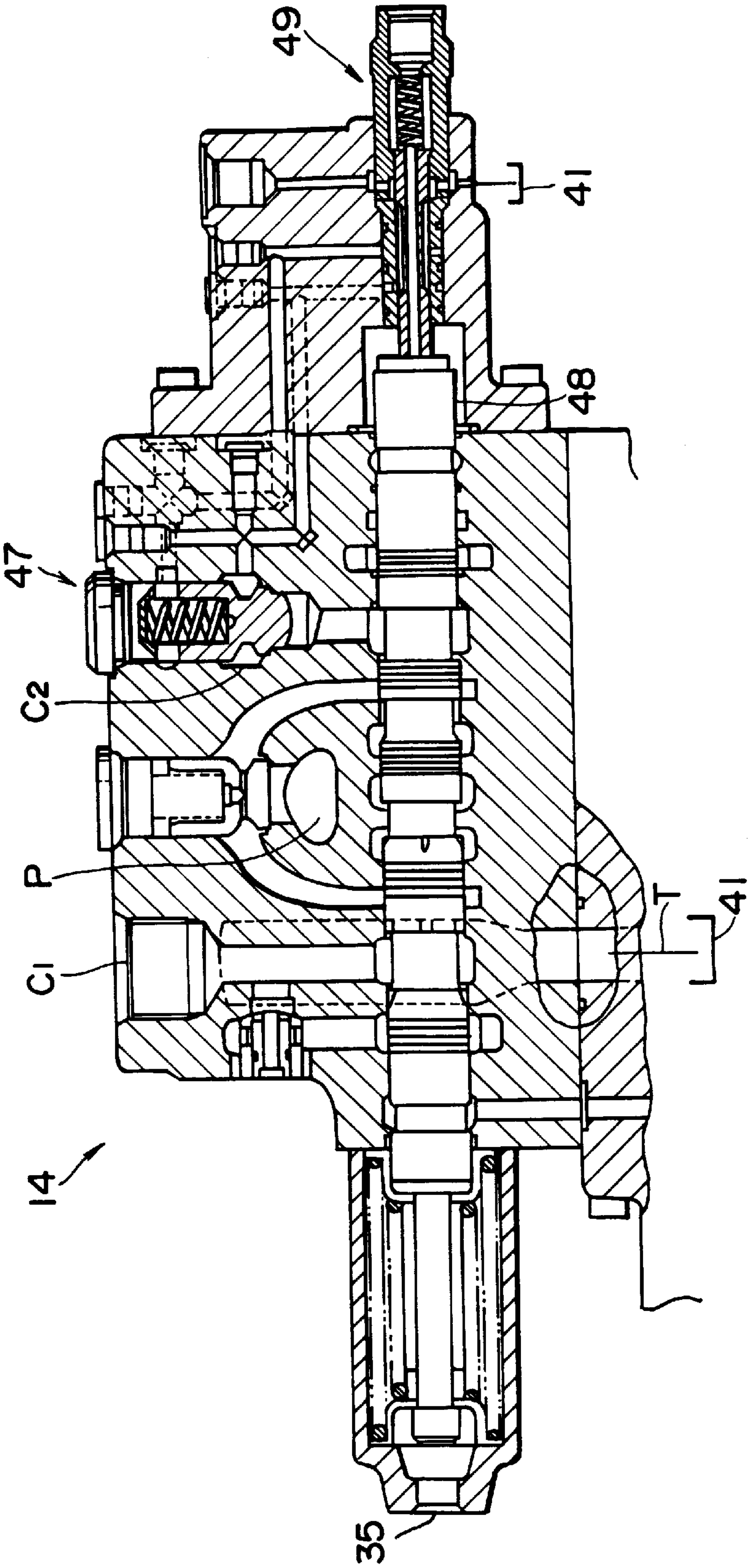
FIG. 5 is a sectional view of a principal portion of the spool valve for boom.

FIG. 5 is a sectional view of a principal portion of the spool valve 14 for boom used in the hydraulic control circuit according to the embodiment of the present invention. In FIG. 5, a communication port P is a port into which is introduced the main pressure oil from the first pump 22. A communication port C1 is a port for communication with a bottom-side oil chamber 45 (shown in FIG. 1), and a communication port C2 is a port for communication with a rod-side oil chamber 46. A communication port T is a port for communication with a tank. Numeral 47 denotes a locking valve, numeral 48 denotes a main spool of the spool valve 14 for boom, and numeral 49 denotes a selector valve.

Figure 6:
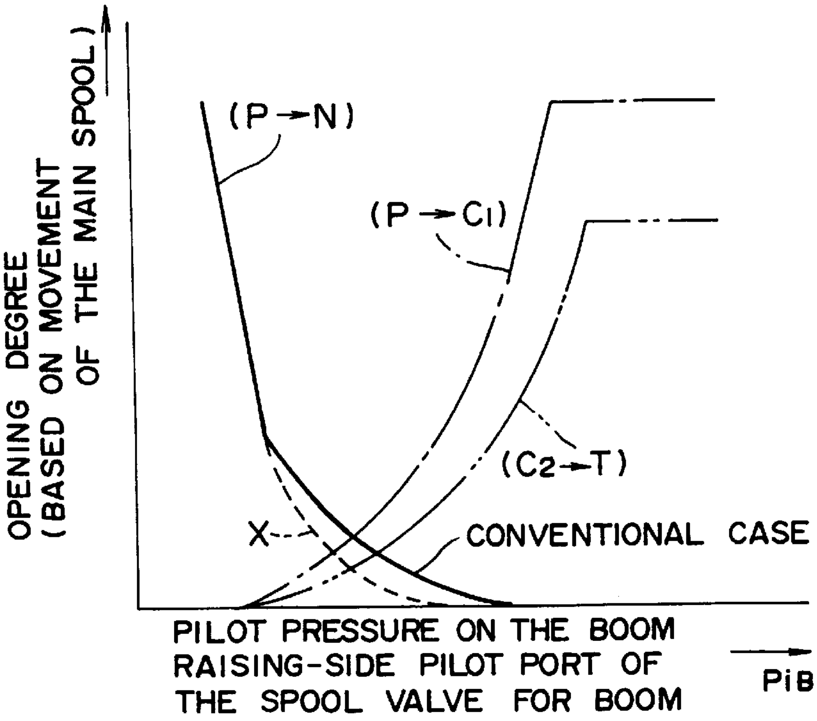
FIG. 6 is a graph showing a relation between the pilot pressure PiB on the boom raising-side pilot port in FIG. 5 and an opening area of a flow path which is opened by a stroke movement of a main spool.

FIG. 6 is a graph showing a relation between the pilot pressure PiB on the boom raising-side pilot port 35 in FIG. 5 and an opening degree of a flow path which is opened by a stroke movement of the main spool 48. In FIG. 6, the mark N denotes a bypass passage 18R in group A, which passage extends through a neutral position of the spool valve 14 for boom. The parenthesized marks connected using arrows represent flow paths among the ports P, C1, C2, T and the passage N.

The operation of the hydraulic control circuit of this embodiment will be described below.

As shown in FIG. 1, in a neutral state of the spool valve 14 for boom corresponding to the neutral position of the operating lever 29 for boom, when the operating lever 29 and the operating lever 30 for arm are operated simultaneously to the boom raising side (the direction of arrow "a" in FIG. 1) and the arm pulling side (the direction of arrow "b" in FIG. 1), respectively, the cut-off valve 19R capable of opening and dosing the oil passage bypass passage 18R) which is for recovering the pressure oil discharged from the first pump 22 into the hydraulic oil tank 41, closes in proportion to the boom raising pilot pressure derived from the hydraulic control valve 27 for boom. In the above case, as shown in FIG. 2, the pilot pressure PCA proportional to the pilot pressure PiB on the boom raising-side pilot port 35 of the spool valve 14 for boom acts on the pilot port 43 of the cut-off valve 19R shown in FIG. 1 through the electromagnetic proportional pressure reducing valve 33R and further through line 50 in accordance with an instruction signal issued from the controller 42. As a result, the step-up sensitivity of the oil pressure from the first pump 22 is enhanced and hence the boom raising gain increases, whereby it is possible to match with the arm pulling operation.

In this embodiment, the cut-off valve 19R closes in proportion to only the boom raising pilot pressure PiB but also to the arm pulling pilot pressure PiA. The effect of the cut-off valve control gain for the arm pulling pilot pressure PiA on pilot pressure PCA is decreased or the maximum instruction signal value is suppressed, whereby upon exertion of the arm pulling pilot pressure PiA on the cut-off valve 19R (as in the state shown in FIG. 3) it is possible to prevent the cut-off valve 19R from dosing the bypass passage 18R to an excess degree and a side effect such as jump-up motion of the boom.

Further, in this embodiment, when the boom operating lever 29 and the arm operating lever 30 are operated simultaneously to the boom raising side and the arm pulling side, respectively, the cut-off valve 19R is controlled using as a parameter the differential pressure ΔP between the arm pulling pilot pressure PiA and the boom raising pilot pressure PiB. When the amount of operation of the arm operating lever 30 is larger than the amount of operation of the boom operating lever 29, the boom raising pressure is increased In the case of a hydraulic excavator which can control a parallel pulling operation when both levers 29 and 30 are operated in the same depth (the same amount of operation), and in the case where the arm operating lever 29 precedes the boom operating lever 30, the boom raising pressure can be increased automatically to quicken the boom raising operation by adjusting the regulator 24 through the controller 42 and the electromagnetic proportional pressure reducing valve 31.

The main spool 48 (shown in FIG. 5) of the spool valve 14 for boom has an opening characteristic corresponding to a curved portion of broken line X in FIG. 6. That is, when the boom raising pilot pressure PiB is relatively low, the opening degree can be fully throttled to (P→N) by control of the cut-off valve 19R.

Figure 7:
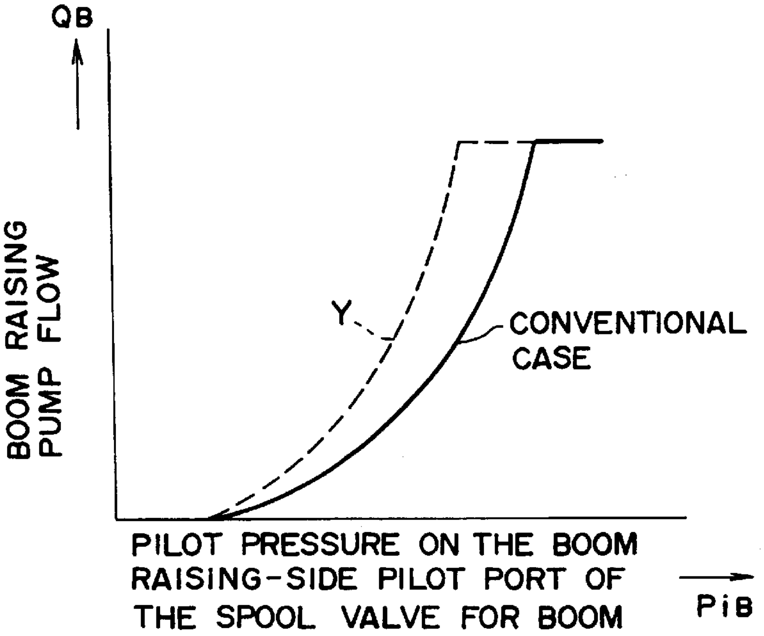
FIG. 7 is a graph showing a relation between the boom raising pilot pressure PiB and a boom raising flow rate QB of oil discharged from a pump in the case where a hydraulic excavator to which the invention is applied adopts a negative control type hydraulic circuit.
Figure 8:
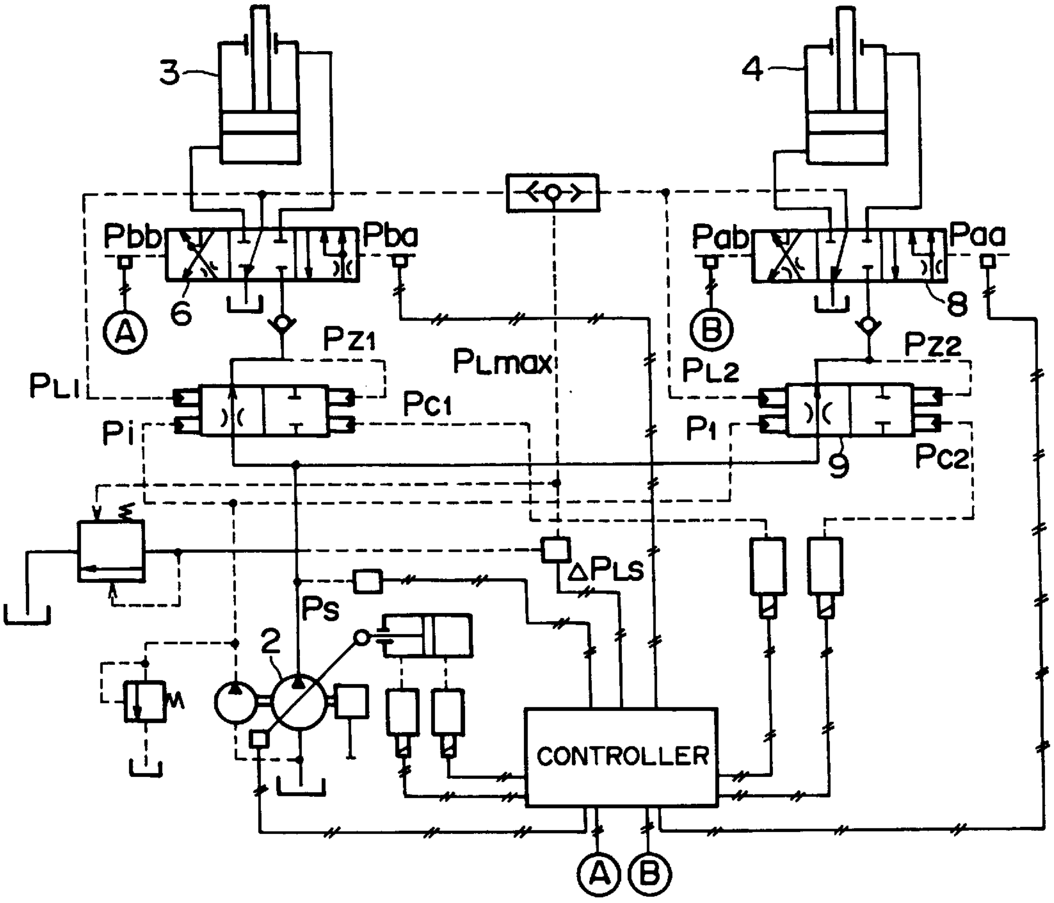
FIG.8 PRIOR ART
FIG. 8 is a circuit diagram showing a conventional hydraulic control circuit.
Figure 9:
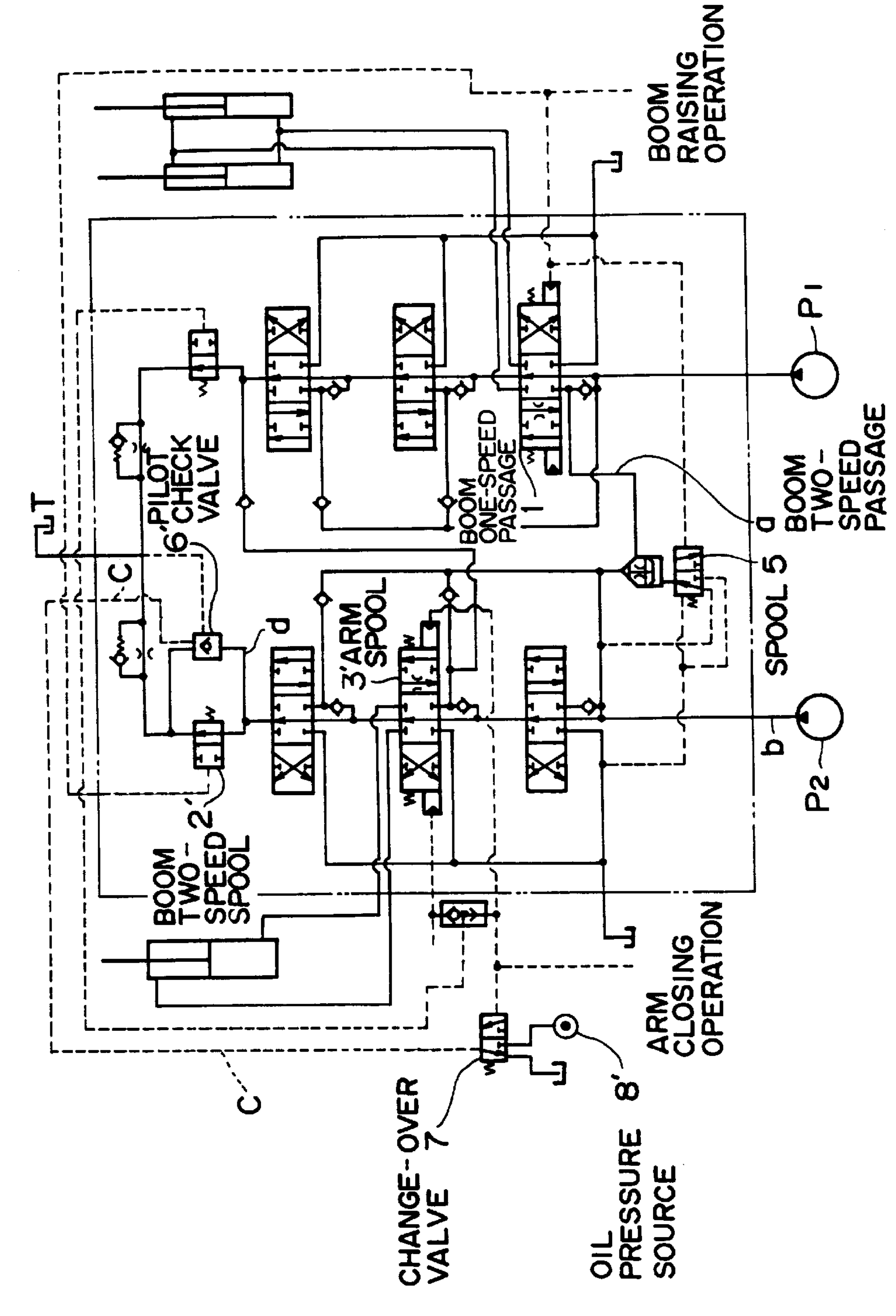
FIG. 9 (PRIOR ART)
FIG. 9 is a circuit diagram showing another conventional hydraulic control circuit.

FIG. 7 is a graph showing a relation between the boom raising pilot pressure PiB and a boom raising flow rate QB of oil discharged from a pump in the case where the hydraulic circuit is a negative control type hydraulic circuit.

In the negative control type hydraulic circuit (not shown) wherein the pump flow rate is controlled by the bypass flow rate downstream of the bypassing passages 18R and 18L which extend through the neutral positions of the spool valve 14 for boom and the spool valve 16 for arm and which provide communication between the first and second pumps 22, 23 and the hydraulic oil tank 41, a negative control pressure generated acts on the regulators 24 and 25. The bypass passage 18R is throttled to increase the boom raising pressure by controlling the cut-off valve 19R, and in addition to this effect, the flow rate of oil discharged from the first pump 22 is also increased. By doing so, as shown in FIG. 7, the boom raising pump flow rate QB increases by an amount corresponding to the curve of broken line Y when the boom raising pilot pressure PiB is relatively low. Thus, in the case of a negative control type hydraulic circuit, the boom raising operation which matches the parallel pulling operation for the arm can be exhibited more effectively.

I claim:

1. A hydraulic control circuit in a hydraulic excavator, comprising:
   - a boom cylinder;
   - a first hydraulic pump for feeding a pressure oil to said boom cylinder in accordance with operation of an operating lever for boom;
   - an arm cylinder;
   - a second hydraulic pump for feeding a pressure oil to said arm cylinder in accordance with operation of an operating lever for arm;
   - a cut-off valve capable of opening and closing an oil passage which leads the pressure oil discharged from said first hydraulic pump into a hydraulic oil tank; and
   - a cut-off valve control means which controls said cut-off valve in a closing direction when said operating lever for boom and said operating lever for arm have simultaneously been operated to a boom raising side and an arm pulling side, respectively, wherein, when said operating lever for boom and said operating lever for an arm have simultaneously been operated to the boom raising side and the arm pulling side, respectively, said cut-off valve control means controls said cut-off valve in the closing direction thereof in accordance with a boom raising pilot pressure which is derived from a hydraulic remote control valve for boom by operation of said operating lever for boom.

2. A hydraulic control circuit in a hydraulic excavator according to claim 1, wherein said cut-off valve is closed in proportion to said boom raising pilot pressure.

3. A hydraulic control circuit in a hydraulic excavator according to claim 1, further comprising:

pump flow increasing means which increases the amount of oil discharged from said first hydraulic pump when said operating lever for boom and said operating lever for arm have simultaneously been operated to the boom raising side and the arm pulling side, respectively.

4. A hydraulic control circuit in a hydraulic excavator, comprising:

a boom cylinder;

a first hydraulic pump for feeding a pressure oil to said boom cylinder in accordance with operation of an operating lever for boom;

an arm cylinder;

a second hydraulic pump for feeding a pressure oil to said arm cylinder in accordance with operation of an operating lever for arm;

a cut-off valve capable of opening and closing an oil passage which leads the pressure oil discharged from said first hydraulic pump into a hydraulic oil tank; and a cut-off valve control means which controls said cut-off valve in a closing direction when said operating lever for boom and said operating lever for arm have simultaneously been operated to a boom raising side and an arm pulling side, respectively, wherein when said operating lever for boom and said operating lever for arm have simultaneously been operated to the boom raising side and the arm pulling side, respectively, said cut-off valve control means controls said cut-off valve in the closing direction thereof in accordance with both a boom raising pilot pressure and an arm pulling pilot pressure which is derived from a hydraulic remote control valve for arm by operation of said operating lever for arm.

5. A hydraulic control circuit in a hydraulic excavator according to claim 4, wherein said cut-off valve is closed in proportion at a low proportional gain to a arm pulling pilot pressure which is derived from a hydraulic remote control valve for boom by operation of said operating lever for boom.

6. A hydraulic control circuit in a hydraulic excavator according to claim 4, wherein, within a predetermined value of a arm pulling pilot pressure which is derived from a hydraulic remote control valve by operation of said operating lever for boom, said cut-off valve is closed in proportion at a low proportional gain to said boom raising pilot pressure, and when the boom raising pilot pressure exceeds said predetermined value, the cut-off valve is closed at a constant gain.

7. A hydraulic control circuit in a hydraulic excavator, comprising:

a boom cylinder;

a first hydraulic pump for feeding a pressure oil to said boom cylinder in accordance with operation of an operating lever for boom;

an arm cylinder;

a second hydraulic pump for feeding a pressure oil to said arm cylinder in accordance with operation of an operating lever for arm;

a cut-off valve capable of opening and closing an oil passage which leads the pressure oil discharged from said first hydraulic pump into a hydraulic oil tank; and a cut-off valve control means which controls said cut-off valve in a closing direction when said operating lever for boom and said operating lever for arm have simultaneously been operated to a boom raising side and an arm pulling side, respectively, wherein when said operating lever for boom and said operating lever for arm have simultaneously been operated to the boom raising side and the arm pulling side, respectively, and when the amount of operation of the operating lever for arm is larger than the amount of operation of the operating lever for boom, said cut-off valve control means increases the boom raising pressure.

8. A hydraulic control circuit in a hydraulic excavator according to claim 7, wherein said cut-off valve is closed in proportion to a differential pressure between an arm pulling pilot pressure which is derived from a hydraulic remote control valve for arm by operation of said operating lever for arm and a boom raising pilot pressure which is derived from a hydraulic remote control valve for boom by operation of said operating lever for boom.

* * * * *